(12) United States Patent
Le et al.

(10) Patent No.: US 10,133,739 B2
(45) Date of Patent: Nov. 20, 2018

(54) NEURAL MACHINE TRANSLATION SYSTEMS WITH RARE WORD PROCESSING

(71) Applicant: GOOGLE LLC, Mountain View, CA (US)

(72) Inventors: Quoc V. Le, Mountain View, CA (US); Minh-Thang Luong, Stanford, CA (US); Ilya Sutskever, Mountain View, CA (US); Oriol Vinyals, Berkeley, CA (US); Wojciech Zaremba, Kluczbork (PL)

(73) Assignee: Google LLC, Mountain View, CA (US)

( * ) Notice: Subject to any disclaimer, the term of this patent is extended or adjusted under 35 U.S.C. 154(b) by 67 days.

(21) Appl. No.: 14/921,925

(22) Filed: Oct. 23, 2015

(65) Prior Publication Data

US 2016/0117316 A1    Apr. 28, 2016

Related U.S. Application Data

(60) Provisional application No. 62/068,601, filed on Oct. 24, 2014.

(51) Int. Cl.
*G06F 17/28* (2006.01)
*G06F 17/27* (2006.01)
(Continued)

(52) U.S. Cl.
CPC .......... *G06F 17/2881* (2013.01); *G06F 7/023* (2013.01); *G06F 7/10* (2013.01);
(Continued)

(58) Field of Classification Search
CPC ............. G06F 17/2818; G06F 17/2827; G06F 17/289; G06F 17/2854
See application file for complete search history.

(56) References Cited

U.S. PATENT DOCUMENTS

| | | | | |
|---|---|---|---|---|
| 2008/0243481 | A1* | 10/2008 | Brants ................. | G06F 17/2818 704/9 |
| 2010/0088085 | A1* | 4/2010 | Jeon ..................... | G06F 17/2818 704/7 |

(Continued)

OTHER PUBLICATIONS

Ilya Sutskever et al. "Sequence to Sequence Learning with Neural Networks", Sep. 10, 2014, pp. 1-10.*

(Continued)

*Primary Examiner* — Richemond Dorvil
*Assistant Examiner* — Mark Villena
(74) *Attorney, Agent, or Firm* — Fish & Richardson P.C.

(57) ABSTRACT

Methods, systems, and apparatus, including computer programs encoded on computer storage media, for neural translation systems with rare word processing. One of the methods is a method training a neural network translation system to track the source in source sentences of unknown words in target sentences, in a source language and a target language, respectively and includes deriving alignment data from a parallel corpus, the alignment data identifying, in each pair of source and target language sentences in the parallel corpus, aligned source and target words; annotating the sentences in the parallel corpus according to the alignment data and a rare word model to generate a training dataset of paired source and target language sentences; and training a neural network translation model on the training dataset.

16 Claims, 3 Drawing Sheets

(51) Int. Cl.
| | |
|---|---|
| G06F 7/02 | (2006.01) |
| G06F 7/10 | (2006.01) |
| G10L 15/02 | (2006.01) |
| G10L 15/16 | (2006.01) |

(52) U.S. Cl.
CPC ...... *G06F 17/2735* (2013.01); *G06F 17/2818* (2013.01); *G06F 17/2827* (2013.01); *G10L 15/02* (2013.01); *G10L 15/16* (2013.01)

(56) References Cited

U.S. PATENT DOCUMENTS

| | | | | |
|---|---|---|---|---|
| 2011/0288852 | A1* | 11/2011 | Dymetman | G06F 17/2818 704/4 |
| 2013/0030787 | A1* | 1/2013 | Cancedda | G06F 17/2881 704/2 |
| 2013/0173269 | A1* | 7/2013 | Adler | G06F 17/2775 704/251 |
| 2013/0197896 | A1* | 8/2013 | Chalabi | G06F 17/2735 704/2 |

OTHER PUBLICATIONS

Gangadharaiah, "Coping with Data-Sparsity in Example-Based Machine Translation," Dissertation Abstracts International, Oct. 31, 2011, 177 pages.

Invitation to Pay Additional Fees and, Where Applicable, Protest Fee in International Application No. PCT/US2015/057229, dated Jan. 20,2016, 7 pages.

Jean et al., "On Using Veiy Large Target Vocabulary for Neural Machine Translation," Prepint. Final version published in Proceedings of the 53rd Annual Meeting of the Association for Computational Linguistics and the 7th International Joint Conference on Natural Language Processing (vol. 1: Long Papers), Mar. 18, 2015, 10 pages.

Luong et al., "Addressing the Rare Word Problem in Neural Machine Translation," Proceedings of the 53rd Annual Meeting of the Association for Computational Linguistics and the 7th International Joint Conference on Natural Language Processing, pp. 11-19, Jul. 2015.

International Preliminary Report on Patentability in International Application No. PCT/US2015/057229, dated May 4, 2017, 14 pages.

International Search Report and Written Opinion in International Application No. PCT/US2015/057229, dated Mar. 30, 2016, 20 pages.

"BerkeleyAligner," Sep. 2009 [retrieved on Oct. 27, 2015]. Retrieved from the Internet: URL<https://code.google.com/p/berkeleyaligner/>, 1 page.

Bandanau et al., "Neural Machine Translation by Jointly Learning to Align and Translate," arXiv:1409.0473v6 [cs.CL], Apr. 24, 2015, pp. 1-15.

Cho et al., "Learning Phrase Representations using RNN Encoder-Decoder for Statistical Machine Translation," arXiv:1406.1078v3 [cs.CL], Sep. 2014, 15 pages.

Kalchbrenner and Blunsom, "Recurrent Continuous Translation Models," Proceedings of the 2013 Conference on Empirical Methods in Natural Language Processing, Oct. 2013, pp. 1700-1709.

Sutskever et al., "Sequence to Sequence Learning with Neural Networks," arXiv:1409.3215v3 [cs.CL], Dec. 14, 2014, pp. 1-9.

* cited by examiner

NEURAL MACHINE TRANSLATION SYSTEMS WITH RARE WORD PROCESSING

CROSS-REFERENCE TO RELATED APPLICATION

This application claims priority to U.S. Provisional Application No. 62/068,601, filed on Oct. 24, 2014. The disclosure of the prior application is considered part of and is incorporated by reference in the disclosure of this application.

BACKGROUND

This specification relates to neural machine translation (NMT) systems. A neural machine translation system is one that includes any neural network that maps a source natural language sentence in one natural language to a target sentence in a different natural language.

Neural networks are machine learning models that employ one or more model layers to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

A number of attempts to develop purely neural translation models have been made. NMT systems are simple to train with backpropagation and their decoder is easy to implement.

A major limitation of current NMT systems is their reliance on a fixed and modest-size vocabulary. As a result, current NMT systems are incapable of translating rare words and can only use a single symbol to represent all out of vocabulary words. Empirically, it has been observed that sentences with many rare words tend to be translated poorly by NMT systems.

SUMMARY

This specification describes how a system implemented as one or more computer programs on one or more computers can be trained to perform, and perform, natural language translations using neural network translation models and rare word post-processing.

The subject matter described in this specification can be implemented in particular embodiments so as to realize one or more of the following advantages. A simple alignment-based technique can mitigate and even overcome the inability of current NMT systems to translate words that are not in their vocabulary. The techniques described in this specification are applicable to any NMT system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
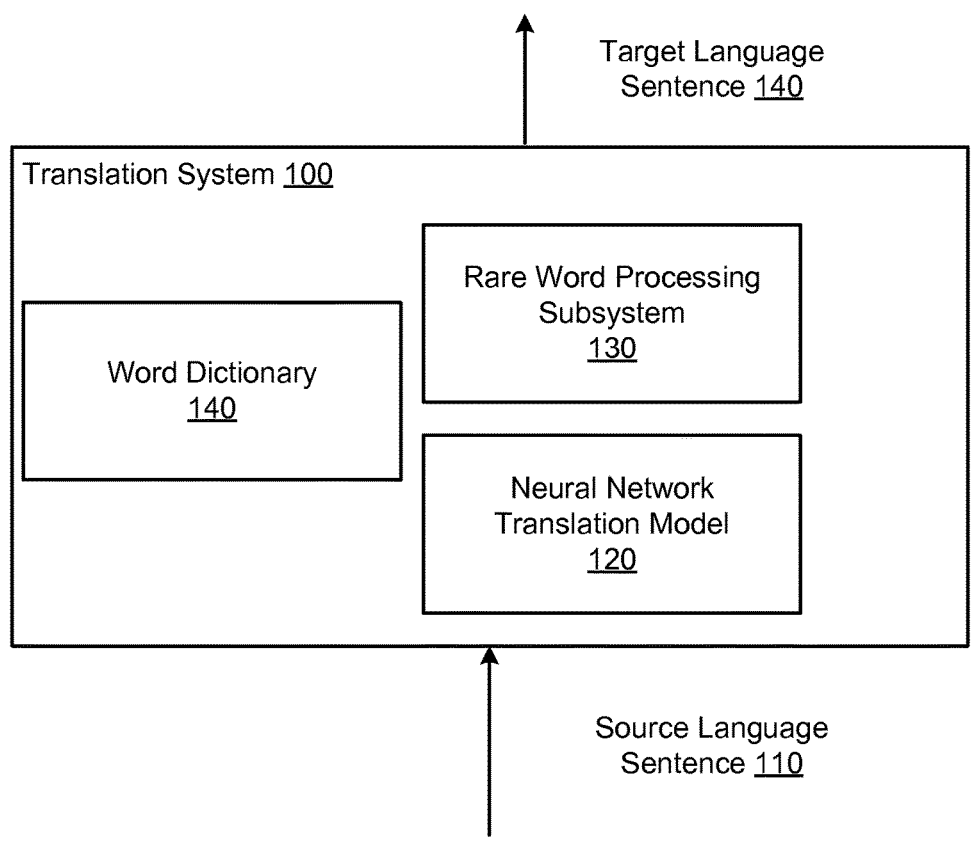
FIG. 1 shows an example translation system.

FIG. 1 shows an example translation system 100. The translation system 100 is an example of a system implemented as computer programs on one or more computers in one or more locations, in which the systems, components, and techniques described below are implemented.

The translation system 100 receives sentences in a source natural language, e.g., a source language sentence 110, and translates the source natural language sentences into target sentences in a target natural language, e.g., a target language sentence 150 for the source language sentence 110.

The translation system 100 includes a neural network translation model 120, a rare word processing subsystem 130, and a word dictionary 140.

The neural network translation model 120 is a neural network that maps source language sentences to target language sentences. The neural network translation model 120 can be any neural network-based translation model. For example, the neural network translation model 120 can be a deep neural network. More specifically, the neural network translation model 120 can be a large deep Long Short-Term Memory model, e.g., a six-layer deep Long Short-Term Memory model.

As yet another example, the neural network translation model 120 can contain a deep encoder Long Short-Term Memory model and a deep decoder Long Short-Term Memory model, with the encoder configured to be operable to read the source sentence, one word at a time, to produce a large hidden state that summarizes the entire source sentence and the decoder being initialized from a final hidden state of the encoder and configured to be operable to generate a target translation, one word at a time, until the decoder emits an end-of-sentence symbol. Such a neural network translation model is described in more detail in Sutskever, Ilya, Oriol Vinyals, and Quoc V Le. "Sequence to sequence learning with neural networks." *Advances in neural information processing systems*. 2014.

As part of mapping source language sentences to target language sentences, the neural network translation model 120 is configured to uniquely represent source words found in a predetermined source language vocabulary and target words found in a predetermined target language vocabulary. That is, the neural network translation model 120 is configured to represent source words that are in the source language vocabulary using tokens that uniquely identify the source words and to generate target sentences that include tokens that uniquely identify target words in the target language vocabulary.

However, in some cases, input source language sentences may include source words that are not included in the source language vocabulary, i.e., source words for which no uniquely identifying token is recognized by the neural network translation model 120 and which the neural network translation model can therefore not uniquely represent. Additionally, in some cases, the neural network translation model 120 may determine that certain target words in target sentences are not words from the target language vocabulary. That is, for a given position in the target language sentence, the neural network translation model 120 may determine that the word at that position should not be any of the words in the target language vocabulary and should instead be an unknown word. Source words that are not in the source language vocabulary and target words that are not in the target language vocabulary will be referred to in this specification as out-of-vocabulary (OOV) words or unknown words.

In order to account for OOV words that appear in target language sentences, the translation system 100 trains the neural network translation model 120 to track the origin in source sentences of unknown words in target sentences. In particular, the translation system 100 trains the neural network translation model 120 to be operable to emit (i) pointer tokens, pointer tokens being unknown tokens that identify a respective source word in the source sentence corresponding to the unknown token, and (ii) null unknown tokens, null unknown tokens being tokens that do not identify any source word in the source sentence. Training the neural network translation model 120 to track the origin in source sentences of unknown words in target sentences is described in more detail below with reference to FIG. 2.

Once the neural network translation model 120 has been trained, the rare word processing subsystem 130 can, for every pointer token in a target sentence emitted by the neural network translation model 120 from a source sentence, replace the pointer token according to the corresponding source word in the source sentence using the word dictionary 140.

The word dictionary 140 is a dictionary that maps words in the source language to translations of the words into the target language. In some implementations and as described below with reference to FIG. 2, the translation system 100 generates the word dictionary 140 in conjunction with the training of the neural network translation model 120. In some other implementations, the system uses a conventional word dictionary as the word dictionary 140.

In particular, when a pointer token is included in a target sentence emitted by the neural network translation model 120, the rare word processing subsystem 130 uses the word dictionary 140 to perform a word translation from the corresponding source word in the source sentence pointed to by the pointer token and replaces the pointer token with the result of the translation. If there is not such a translation in the word dictionary 140, the rare word processing subsystem 130 replaces the pointer token in the target sentence with the corresponding source word from the source sentence. Generating a target sentence from a source sentence is described in more detail below with reference to FIG. 3.

Figure 2:
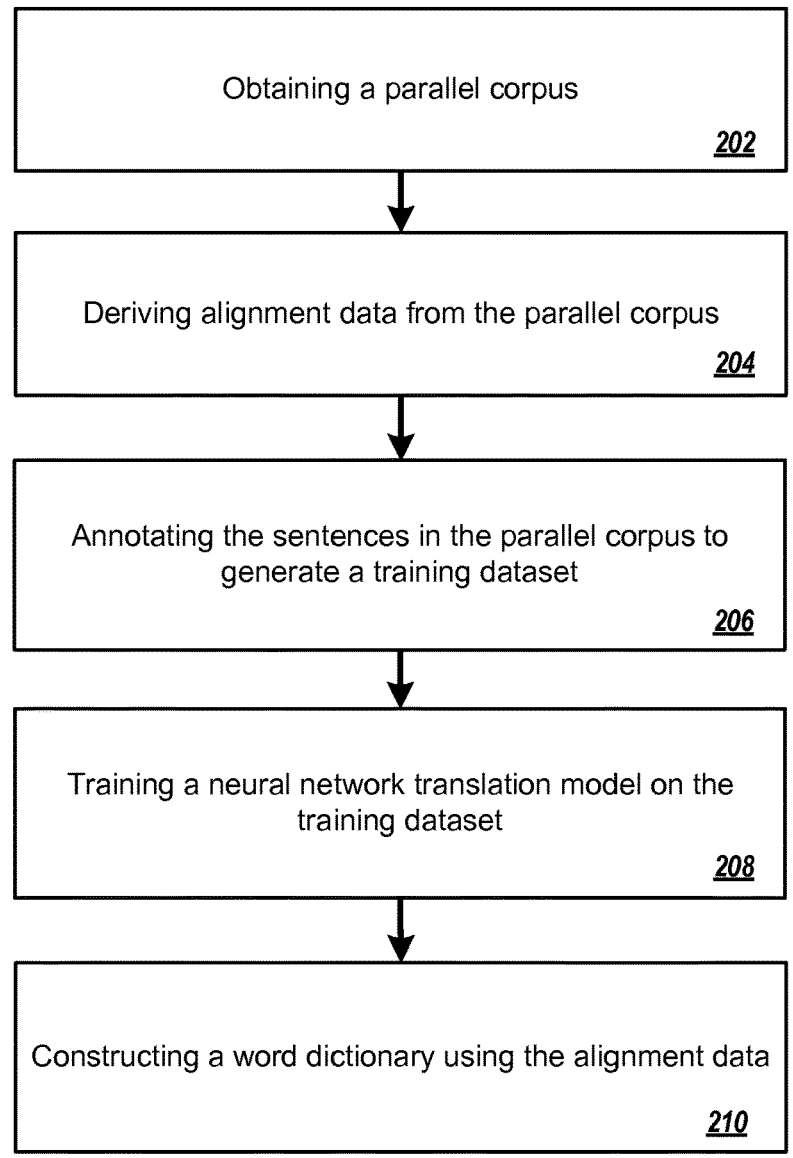
FIG. 2 is a flow diagram of an example process for training a neural translation model.

FIG. 2 is a flow diagram of an example process 200 for training a neural network translation model. For convenience, the process 200 will be described as being performed by a system of one or more computers located in one or more locations. For example, a translation system, e.g., the translation system 100 of FIG. 1, appropriately programmed, can perform the process 200.

The system obtains a parallel corpus (step 202). The parallel corpus includes pairs of sentences, with each pair including a source language sentence and a target language sentence that is a translation of the source language sentence into the target language.

The system derives alignment data from the parallel corpus (step 204). The alignment data identifies, for each pair of sentences in the parallel corpus, aligned source and target words. That is, the alignment data identifies, for each target word in the target language sentence, the source word in the source language sentence to which the target word is aligned, if any. The system can derive the alignment data from the parallel corpus using an unsupervised word alignment algorithm. For example, the word alignment algorithm can be one implemented in version 2.0 of the word alignment software package BerkeleyAligner, for example, which is available at https://code.google.com/p/berkeley-aligner/.

The system annotates the sentences in the parallel corpus according to the alignment data to generate a training dataset of paired source and target language sentences (step 206). In particular, the system annotates the sentences in accordance with a particular annotation strategy specified by what will be referred to as a rare word model. This specification describes in particular three rare word model annotation strategies: the copyable model, the positional all model, and the positional unknown model.

In the copyable model, multiple tokens are used for unknown source words and unknown target words, each unknown target word that is aligned to an unknown source word uses the same unknown token as the unknown source word, and each unknown target word that has no alignment or is aligned with a known source word uses a special null unknown token.

In particular, in the copyable model, the system annotates, for each pair of sentences, the unknown source words in the source language sentence in the pair with distinct unknown source tokens in order, with the exception that multiple instances of any unknown source word are annotated with identical unknown source tokens. The system then annotates the unknown target words in the target sentence by annotating unknown target words that are aligned to an unknown source word with the same unknown token as that of the unknown source word and annotating unknown target words that have no alignment or are aligned with known source words with the null unknown token.

In the positional all model, only a single unknown token is used and, in each target sentence, a positional token is inserted after every target word in the target sentence that indicates (i) how the target word is aligned by position relative to a source word, if the relative position is within a predetermined range, or (ii) that the target word is not aligned with any source word.

In particular, in the positional all model, the system annotates, for each pair of sentences, each unknown source word in the source sentence with the same unknown token. The system then annotates each unaligned target word in the target sentence with a null token and annotates each aligned target word in the target sentence within a predetermined range of positions relative to the aligned source word with a positional token that indicates a relative position of the aligned target word in the target sentence relative to the position of the aligned source word in the source sentence. For example, the predetermined range of positions can be $-7, -6, \ldots -1, 0, 1, \ldots 7$. In some implementations, the aligned target words that are not within the predetermined range of positions are not annotated.

In the positional unknown model, distinct tokens are used that each simultaneously denote (a) an unknown target word and (b) a relative position with respect to the aligned source word within a range of relative positions and a universal unknown token is used for all other unknown source words and target words. For example, the range can be $-7, -6, \ldots -1, 0, 1, \ldots 7$.

In particular, in the positional unknown model, the system annotates only the unknown words in the source and target sentences in each pair of sentences. More specifically, the system annotates each aligned unknown target word with a positional token that denotes the relative position of the target word relative to the corresponding aligned source word, if the relative position is within the range of relative positions and annotates all otherwise unannotated unknown source words and unknown target words with a universal unknown token. In some implementations, the system also annotates each unaligned unknown target word with a null token.

The system trains a neural network translation model, e.g., the neural network translation model 120 of FIG. 1, on the training dataset (step 208). The system trains the neural network translation model on the training dataset using conventional neural network training techniques, e.g., a backpropagation training technique.

By training the neural network translation model on the training dataset, the system trains the neural network translation model to track the origin in source sentences of unknown words in target sentences and to emit for each unknown word in the target sentence a respective unknown token and to be operable to emit (i) pointer tokens, pointer tokens being unknown tokens that identify a respective source word in the source sentence corresponding to the unknown token, and (ii) null unknown tokens, null unknown tokens being tokens that do not identify any source word in the source sentence.

The system constructs a word dictionary using the alignment data (step 210). The system constructs the word dictionary for use in word translations in a post-processing step performed on a neural network generated machine translation including out-of-vocabulary tokens in a target sentence. In particular, the system constructs the word dictionary by mapping aligned unknown target words in target sentences to the source words to which the target words are aligned. In some other implementations, rather than construct the word dictionary, the system uses a conventional word dictionary that includes translations from the source language to the target language in the post-processing step.

Figure 3:
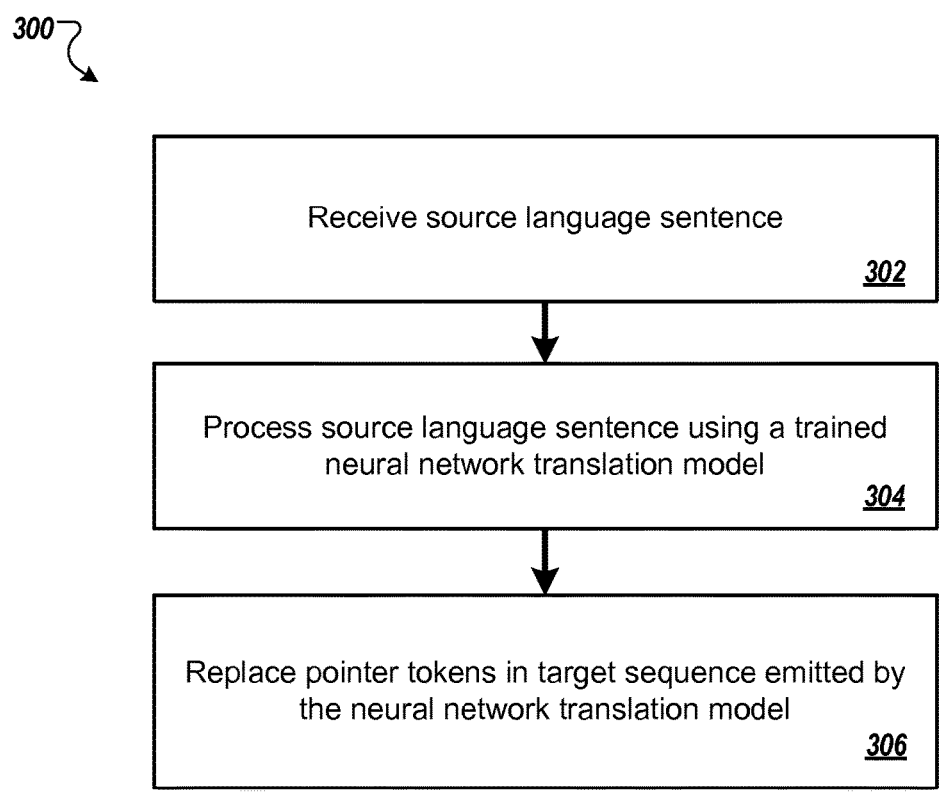
FIG. 3 is a flow diagram of generating a target language sentence from a source language sentence.

FIG. 3 is a flow diagram of an example process 300 for generating a target language sentence from an input language sentence. For convenience, the process 300 will be described as being performed by a system of one or more computers located in one or more locations. For example, a translation system, e.g., the translation system 100 of FIG. 1, appropriately programmed, can perform the process 300.

The system receives a source language sentence (step 302).

The system processes the sentence using a trained neural network translation model, e.g., the neural network translation model 120 of FIG. 1, to generate a target language sentence (step 304).

As part of processing the sentence using the trained neural network translation model, the system annotates the source language sentence in accordance with the rare word model annotation strategy that was used when training the neural network translation model.

In particular, in the copyable model, the system annotates any unknown source words in the source language sentence with distinct unknown source tokens in order, with multiple instances of any unknown source word being annotated with identical unknown source tokens. In the positional all model and the positional unknown model, the system annotates each unknown source word in the source language sentence with the same unknown token.

The system provides the annotated source sentence as input to the trained neural network translation model and the neural network translation model generates a target language sentence.

If there are any unknown target words in the target language sentence, the neural network translation system has been trained to emit, for each unknown target word, either (i) a pointer token, pointer tokens being unknown tokens that identify a respective source word in the source sentence corresponding to the unknown token, or a (ii) null unknown token, null unknown tokens being tokens that do not identify any source word in the source sentence, for each unknown target word.

The way in which the pointer token identifies the source word in the source sentence is dependent on the rare word model annotation strategy that was used when training the neural network translation model.

In particular, in the copyable model, each pointer token is the same as an unknown source token used to annotate a particular unknown source word in the source language sentence. In the positional all model and the positional unknown model, each pointer token is a positional token that indicates how the target word is aligned by position relative to the corresponding source word.

The system replaces any pointer tokens in the target language sentence to generate the final translation for the source language sentence (step 306). That is, the system identifies, using each pointer token in the target language, the source word that corresponds to the pointer token. The system the uses a word dictionary to perform a word translation from the corresponding source word in the source sentence and replaces the pointer token with the result of the translation, or, if there is not such translation in the word dictionary, replaces the pointer token in the target sentence with the corresponding source word from the source sentence.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented translation system for translating natural language text from a source sentence in a source language to a target sentence in a target language, the translation system comprising one or more computers and one or more storage devices storing translation instructions and translation data, wherein:
the translation data includes:
a word dictionary; and
a neural network translation model trained to process a sequence of inputs corresponding to words in the source sentence thereby generating a sequence of outputs corresponding to words in the target sentence, including emitting a respective unknown token in the sequence of outputs for each out-of-vocabulary (OOV) word that occurs in the target sentence, the model being operable to emit pointer tokens as a first type of unknown token and null tokens as a second type of unknown token, wherein pointer tokens are unknown tokens that identify a respective source word in the source sentence that corresponds to the unknown token, and null tokens are tokens that do not identify any source word in the source sentence that corresponds to the unknown token; and
the translation instructions are operable, when executed by the one or more computers, to cause the one or more computers to perform operations comprising:
for every pointer token in the target sentence emitted by the neural network translation model from the source sentence, replacing the pointer token according to the corresponding source word in the source sentence.

2. The translation system of claim 1, wherein replacing every pointer token comprises, for each pointer token:
using the word dictionary to perform a word translation from the respective source word in the source sentence that is identified by the pointer token and replacing the pointer token with the result of the word translation, or, if there is no such translation in the word dictionary for the respective source word in the source sentence that is identified by the pointer token, replacing the pointer token in the target sentence with the respective source word from the source sentence.

3. The translation system of claim 1, wherein:
the neural network translation model contains a deep encoder Long Short-Term Memory model and a deep decoder Long Short-Term Memory model, wherein:
the encoder is trained to be operable to read the source sentence, one word at a time, to produce a large hidden state that summarizes the entire source sentence; and
the decoder is initialized from a final hidden state of the encoder and is trained to be operable to generate a target translation, one word at a time, until the decoder emits an end-of-sentence symbol.

4. The translation system of claim 1, wherein:
the neural network translation model is a deep neural network.

5. The translation system of claim 1, wherein:
the neural network translation model is a large deep Long Short-Term Memory model.

6. The translation system of claim 1, wherein:
the neural network translation model is a six-layer deep Long Short-Term Memory model.

7. A method performed by one or more computers of a translation system, comprising:
providing, to a neural network translation model, a sequence of inputs corresponding to words of a source sentence in a source language;
obtaining, from the neural network translation model, as a result of the neural network translation model processing the sequence of inputs, a sequence of outputs corresponding to words of a target sentence in a target language,
wherein the sequence of outputs includes a pointer token that represents an out-of-vocabulary (OOV) word that occurs in the target sentence,
wherein the pointer token identifies a word from the source sentence that corresponds to the OOV word in the target sentence;
determining whether a translation in the target language is available in a word dictionary for the word from the source sentence that corresponds to the OOV word in the target sentence; and
in response to determining that a translation in the target language is available in the word dictionary for the word from the source sentence that corresponds to the OOV word in the target sentence, replacing the pointer token with the translation for the word from the source sentence that corresponds to the OOV word in the target sentence.

8. The method of claim 7, wherein:
the sequence of outputs further includes a null token that represents a second OOV word that occurs in the target sentence, and the null token does not identify any word from the source sentence that corresponds to the second OOV word in the target sentence.

9. The method of claim 7, wherein the sequence of outputs further includes a second pointer token that represents a second OOV word that occurs in the target sentence, and the second pointer token identifies a second word from the source sentence that corresponds to the second OOV word in the target sentence;
wherein the method further comprises:
determining whether a translation in the target language is available in the word dictionary for the second word from the source sentence that corresponds to the second OOV word in the target sentence; and
in response to determining that a translation in the target language is not available in the word dictionary for the second word from the source sentence that corresponds to the second OOV word in the target sentence, replacing the second pointer token in the target sentence with the second word from the source sentence in the source language.

10. The method of claim 7, wherein:
the neural network translation model is a deep neural network.

11. The method of claim 7, wherein:
the neural network translation model is a large deep Long Short-Term Memory model.

12. A non-transitory computer-readable medium having instructions stored thereon that, when executed by one or more computers, cause the one or more computers to perform operations comprising:
providing, to a neural network translation model, a sequence of inputs corresponding to words of a source sentence in a source language;
obtaining, from the neural network translation model, as a result of the neural network translation model processing the sequence of inputs, a sequence of outputs corresponding to words of a target sentence in a target language,
wherein the sequence of outputs includes a pointer token that represents an out-of-vocabulary (OOV) word that occurs in the target sentence, wherein the pointer token identifies a word from the source sentence that corresponds to the OOV word in the target sentence;

determining whether a translation in the target language is available in a word dictionary for the word from the source sentence that corresponds to the OOV word in the target sentence; and in response to determining that a translation in the target language is available in the word dictionary for the word from the source sentence that corresponds to the OOV word in the target sentence, replacing the pointer token with the translation for the word from the source sentence that corresponds to the OOV word in the target sentence.

13. The computer-readable medium of claim 12, wherein:
the sequence of outputs further includes a null token that represents a second OOV word that occurs in the target sentence, and the null token does not identify any word from the source sentence that corresponds to the second OOV word in the target sentence.

14. The computer-readable medium of claim 12, wherein the sequence of outputs further includes a second pointer token that represents a second OOV word that occurs in the target sentence, and the second pointer token identifies a second word from the source sentence that corresponds to the second OOV word in the target sentence;

wherein the operations further comprise:

determining whether a translation in the target language is available in the word dictionary for the second word from the source sentence that corresponds to the second OOV word in the target sentence; and in response to determining that a translation in the target language is not available in the word dictionary for the second word from the source sentence that corresponds to the second OOV word in the target sentence, replacing the second pointer token in the target sentence with the second word from the source sentence in the source language.

15. The computer-readable medium of claim 12, wherein:
the neural network translation model is a deep neural network.

16. The computer-readable medium of claim 12, wherein:
the neural network translation model is a large deep Long Short-Term Memory model.

\* \* \* \* \*

UNITED STATES PATENT AND TRADEMARK OFFICE
CERTIFICATE OF CORRECTION

PATENT NO. : 10,133,739 B2  
APPLICATION NO. : 14/921925  
DATED : November 20, 2018  
INVENTOR(S) : Le et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 166 days.

Signed and Sealed this
Sixteenth Day of July, 2019

Andrei Iancu
*Director of the United States Patent and Trademark Office*